US012784968B2

(12) United States Patent
Choi et al.

(10) Patent No.: US 12,784,968 B2
(45) Date of Patent: Nov. 3, 2026

(54) TRANSFORMER-BASED BALUN WITH CORRECTION FOR DIFFERENTIAL IMBALANCE

(71) Applicant: Intel Corporation, Santa Clara, CA (US)

(72) Inventors: Jaeyoung Choi, Portland, OR (US); Elham Mohammadi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 608 days.

(21) Appl. No.: 17/483,830

(22) Filed: Sep. 24, 2021

(65) Prior Publication Data

US 2023/0107225 A1 Apr. 6, 2023

(51) Int. Cl.

| | |
|---|---|
| ***H01F 5/00*** | (2006.01) |
| ***H01F 27/29*** | (2006.01) |
| ***H01F 27/30*** | (2006.01) |
| ***H01F 27/38*** | (2006.01) |

(52) U.S. Cl.

CPC ........... *H01F 27/306* (2013.01); *H01F 27/29* (2013.01); *H01F 27/38* (2013.01)

(58) Field of Classification Search

CPC ....................................................... H01F 27/29

USPC ........................................ 336/200, 223, 225

See application file for complete search history.

(56) References Cited

U.S. PATENT DOCUMENTS

| | | | | |
|---|---|---|---|---|
| 2014/0266531 A1* | 9/2014 | Leipold | H03F 1/3241 336/170 | |
| 2020/0144976 A1* | 5/2020 | Dasgupta | H03F 3/604 | |

OTHER PUBLICATIONS

Peng Huang, et al., "Design and Modeling of an On-Chip Asymmetric Tap Balun for CMOS Millimeter-Wave Circuits", IEEE, University of Electronic Science and Technology of China, 2014, 4 pages.

* cited by examiner

*Primary Examiner* — Ronald Hinson

(74) *Attorney, Agent, or Firm* — Viering, Jentschura & Partner mbB

(57) ABSTRACT

A circuitry including a first winding coupled to a second winding; a first terminal coupled to a first end of the first winding; a second terminal coupled to a second end of the first winding, wherein there is an imbalance between the first terminal and the second terminal when a current flows through the first winding; and a third terminal coupled to the second winding, wherein a terminal position of the third terminal along the second winding mitigates the imbalance on the first winding.

15 Claims, 12 Drawing Sheets

TRANSFORMER-BASED BALUN WITH CORRECTION FOR DIFFERENTIAL IMBALANCE

TECHNICAL FIELD

This disclosure may generally relate to the fields of wireless communication and signal processing.

BACKGROUND

The differential, or balanced, port of a transformer-based balun circuit may exhibit differential imbalance because of the capacitive coupling to an unbalanced port of the balun.

Unbalanced impedance and signal amplitude can degrade the linearity performance and reliability of a differential circuit such as a differentially driven balun.

BRIEF DESCRIPTION OF THE DRAWINGS

In the drawings, like reference characters generally refer to the same parts throughout the different views. The drawings are not necessarily to scale, emphasis instead generally being placed upon illustrating the exemplary principles of the disclosure. In the following description, various aspects of the disclosure are described with reference to the following drawings, in which.

DETAILED DESCRIPTION

A balun may be equipped with lumped capacitors at certain points of the transformer winding, or coil, to tune a differential imbalance to zero at a given frequency point. For example, a differential port of a balun may be loaded with a capacitor on one side to cancel the differential imbalance. The location and value of capacitor may vary depending on the frequency.

Loading a lumped capacitor on the differential port may only correct the differential imbalance across a narrow frequency. Correcting the imbalance with a capacitor is fixed in correlation with the value of the capacitor on a single spot of the winding which is narrowband in nature.

Loading additional capacitors on a balun decreases the self-resonance frequency (SRF) of the transformer, which further limits the usable frequency range of the balun.

Additionally, a balun may include a dummy metal winding under the two main windings of a transformer balun to counteract a differential imbalance. The dummy winding may have two terminals or ports. For example, the dummy winding below the transformer winding may have one of its terminals tied to ground. Alternatively, the dummy metal winding may introduce different capacitive loading to the positive and negative terminals of the transformer winding. Introducing additional capacitance may lower the SRF of the balun.

Traditionally, a balun has an equal distance between the single-ended port and both terminals of the differential port, resulting in a symmetrical structure of the balun. The single-ended port may include two terminals, one for carrying an unbalanced signal and the other connected to ground. The differential port may include a voltage, current, or impedance imbalance between the two differential terminals. To counteract an imbalance between the two differential terminals, we may introduce a new, controlled, imbalance to the balun design layout structure. Balancing the distance between the single-ended port on one winding of the balun and the two terminals of a differential port on another winding may introduce the new imbalance. This may result in an asymmetrical design of the balun. By moving the location of the single-ended port alone, the imbalance on the differential port may be mitigated. For example, the position of the single-ended may manipulate the imbalance so that the impedance transformation (e.g., signal transfer) from one winding to the other is better balanced on the differential port. The asymmetrical design, may create an adjustment of the electric field distributed across the entire transformer winding, which achieves a wideband correction compared to a cancellation based on a lumped capacitor.

Figure 1:
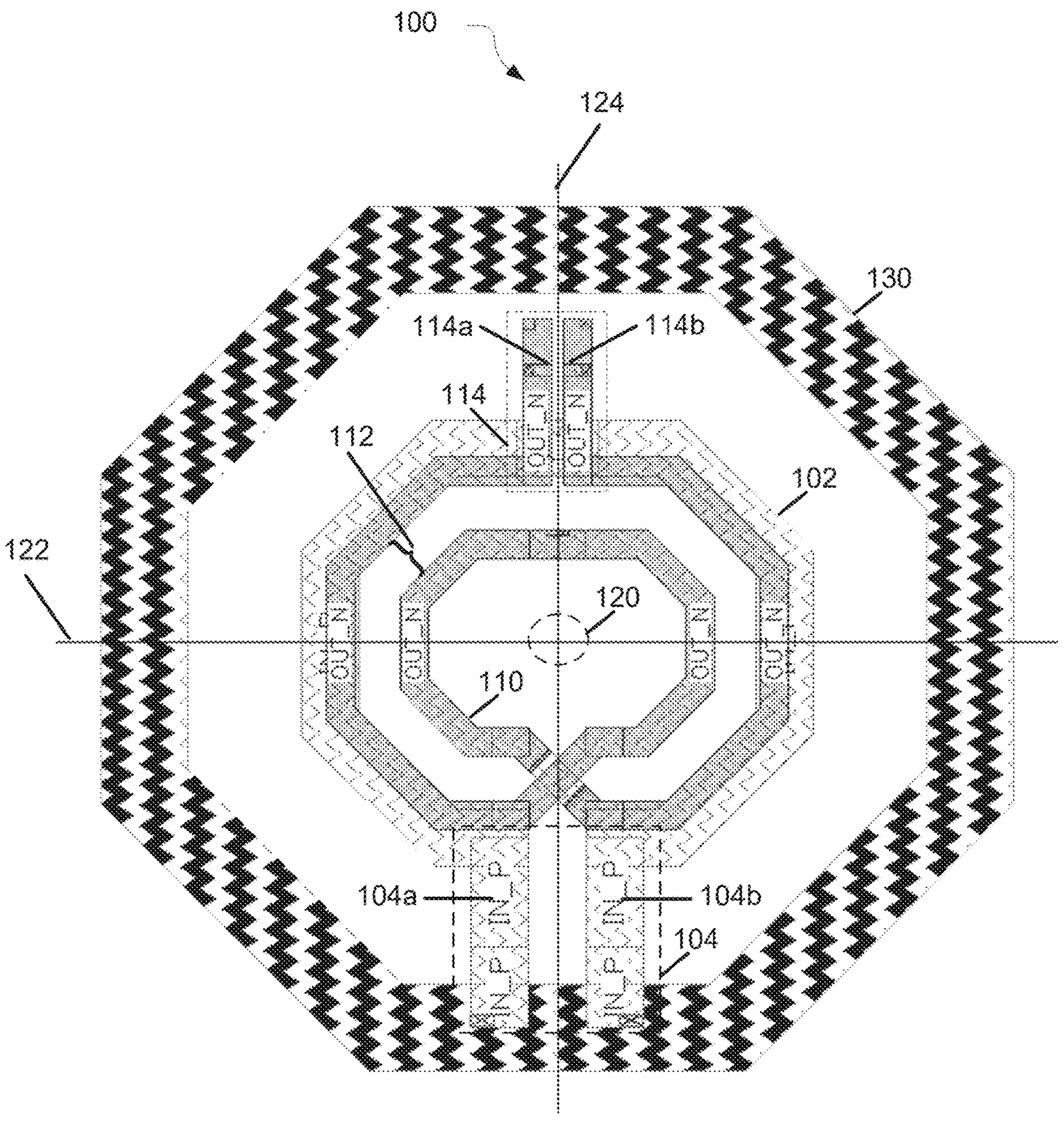
FIG. 1 illustrates an exemplary balun with symmetrical port placement.

FIG. 1 illustrates a symmetrical balun 100. For illustrative purposes, FIG. 1 shows an octagonal shape for balun 100. The disclosure may also apply to other shaped baluns, such as square, rectangular, or other shape baluns. Balun 100 may include first winding 102. First winding 102 may include two terminals 104*a* and 104*b* at each end of first winding 102. Terminal 104*a* may be configured to receive a positive signal. Terminal 104*b* may be configured to receive a negative signal. Differential port 104 may include terminals 104*a* and 104*b* and be configured to receive a balanced signal. For example, an inverted signal on terminal 104*a* and a non-inverted signal on terminals 104*b*, or vice-versa. As shown in FIG. 1, winding 102 may include one turn. Balun 100 may include second winding 110. Second winding 110 may include two turns creating space 112 between the two turns of second winding 110. Second winding 110 may include single-ended port 114 which includes one terminal 114*a* configured for an unbalanced signal and a second terminal 114*b* connected to a reference signal, such as ground. First winding 102 and second winding 110 may be electronically coupled to each other. The first winding 102 may overlap the outer turn of second winding 110. It should be noted that other balun designs may be applicable to the present disclosure. Optionally, balun 100 may include outer ring 130 which encircles first winding 102 and second winding 110. Furthermore, outer ring 130 may be coupled to first winding and/or second winding 110. Additionally, outer ring 130 may be coupled to a ground reference signal. As shown in FIG. 1, balun 100 may include a symmetrical design centered around center 120, where the center is a point of intersection between horizontal center line 122 and vertical center line 124. The symmetrical design of balun 100 may introduce a differential imbalance between the left side and right side of balun 100. The distance between terminal 104*a* and port 114 is equidistant to the distance between terminal 104*b* and port 114. The equidistance design between differential port 104 and single-ended port 114 may introduce a differential imbalance as further described below. However, an asymmetrical design having varying distances between differential terminals 104*a* and 104*b* and single-ended port 114 may mitigate a differential imbalance.

Figure 2:
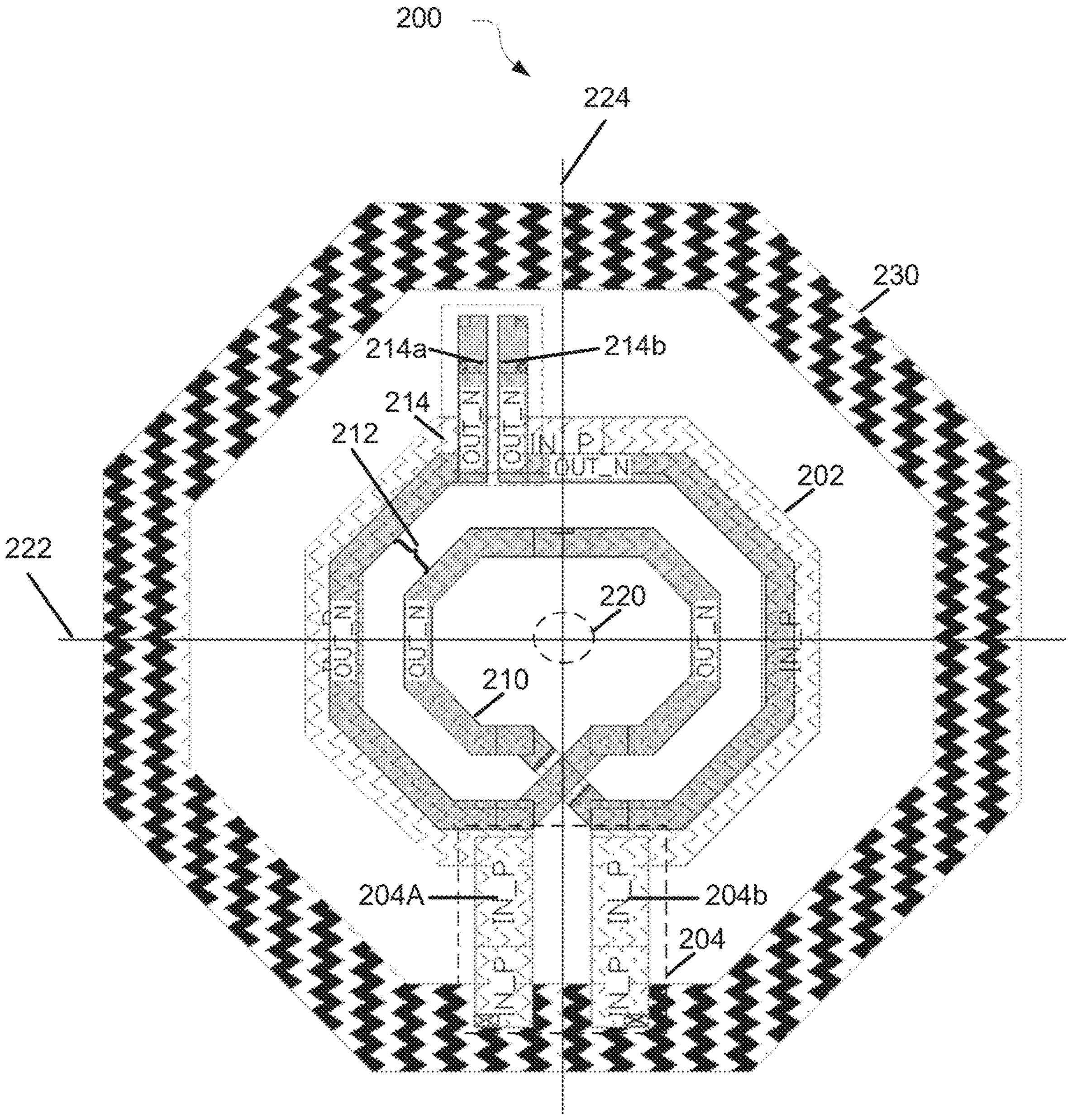
FIG. 2 illustrates an exemplary balun with asymmetrical port placement.

FIG. 2 shows an asymmetrical design of balun 200. Balun 200 may include a similar design as the design of balun 100 in FIG. 1. However, single-ended port 214 is not positioned along vertical center line 224. Similar to balun 100, balun 200 may include first winding 202. First winding 202 may include two terminals 204*a* and 204*b* at each end of first winding 202. Terminal 204*a* may be configured to receive a positive signal. Terminal 204*b* may be configured to receive a negative signal. Differential port 204 may include terminals 204*a* and 204*b* and be configured to receive a balanced signal. For example, both an inverted and non-inverted signal. As shown in FIG. 2, winding 202 may include one turn. Balun 200 may include second winding 210. Second winding 210 may include two turns creating space 212 between the two turns of second winding 210. Second winding 210 may include single-ended port 214 which includes one terminal 214*a* configured for an unbalanced signal and a second terminal 214*b* connected to ground, similar to single-ended port 114. First winding 202 and second winding 210 may be electronically coupled to each other. The first winding 202 may overlap the outer turn of second winding 210. Optionally, balun 200 may include outer ring 230 which encircles first winding 202 and second winding 210. Furthermore, outer ring 230 may be coupled to first winding 202 and/or second winding 210. Additionally, outer ring 230 may be connected to a ground reference signal. As shown in FIG. 2, balun 200 may be centered around center 220, where the center is a point of intersection between horizontal center line 222 and vertical center line 224. The asymmetrical design of balun 200 may mitigate a differential imbalance between the left side and right side of balun 200. The asymmetrical design may include varying distances between differential terminals 204*a* and 204*b* and single-ended port 214 to mitigate a differential imbalance. As shown in FIG. 2, the position of single-ended port 214 is to the left of vertical center line 224.

The design of balun 100 may generate a differential imbalance of approximately 0.3 dB. The asymmetrical design of balun 200 may differ from the symmetrical design of balun 100 in that the single-ended port may be 12 μm left of center line 224 along second winding 210. The design of balun 200 may also include first winding 202 having a radius of 34.5 μm from center 220 to inner metal edge of the turn coil of 34.5 μm. First winding 202 may have a metal width (e.g., thickness) of 9.9 μm. Second winding 210 may have a radius of 22.5 μm from center 220 to the inner metal edge of the inner turn coil of the second winding. Additionally, second winding 210 may include a space of 7.9 μm between the outer metal edge of the inner turn coil to the inner metal edge of the outer turn coil. Second winding 210 may also include a metal width of 5 um.

Figure 3:
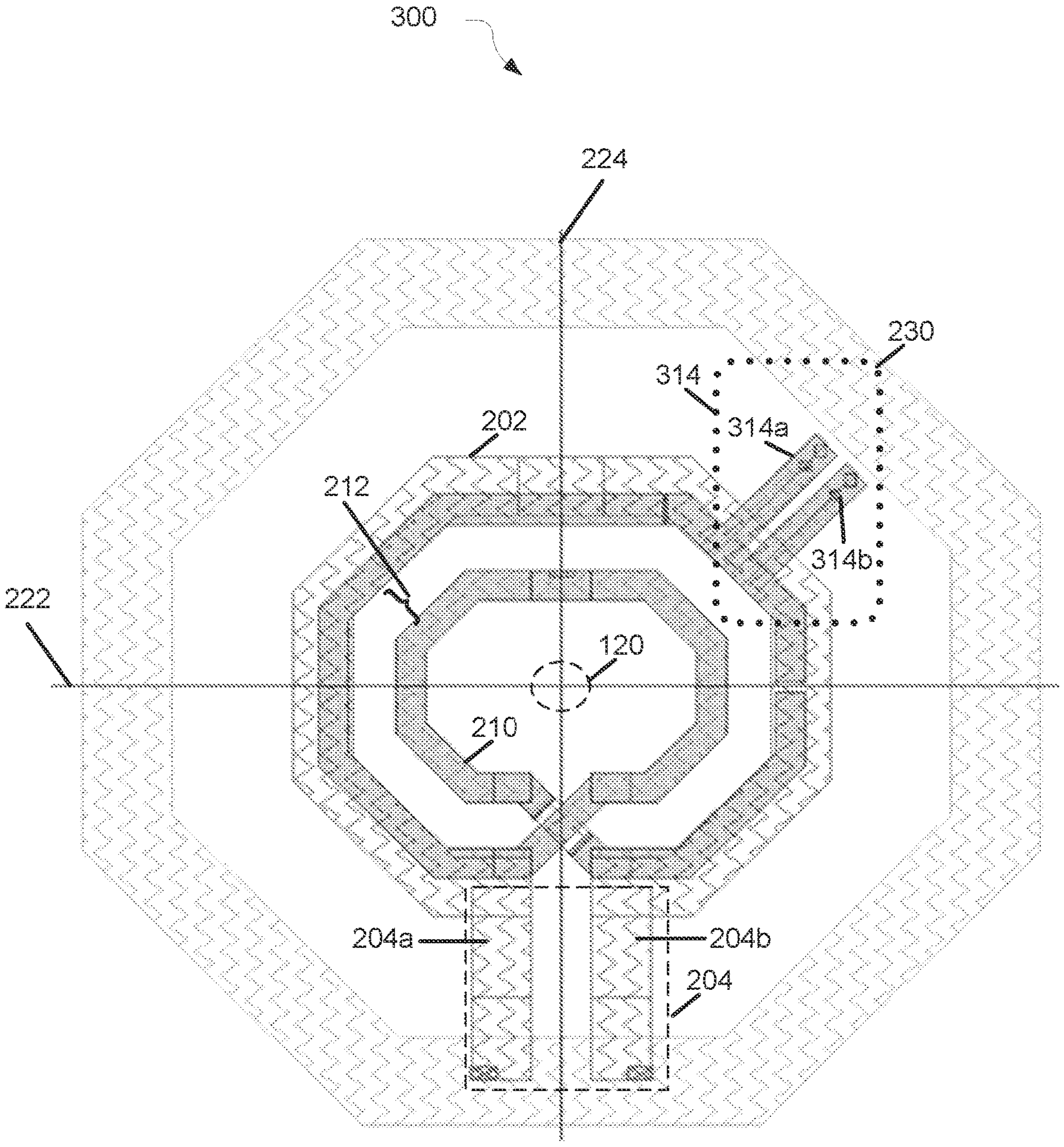
FIG. 3 illustrates an exemplary balun with asymmetrical port placement.

FIG. 3 shows an alternative asymmetrical design of balun 300. Balun 300 may include similar components as balun 200 shown in FIG. 2. Balun design 300 may include single-ended port 314 which includes one terminal 314*a* configured for an unbalanced signal and a second terminal 314*b* connected to ground, similar to single-ended port 114. However, single-ended port 314, similar to single-ended port 214 of FIG. 2, has a position on a different segment of second winding 210. As shown in FIG. 3, the position of single-ended port 314 is to the right of vertical center line 224. Both balun 200 and balun 300 have an asymmetrical design for mitigating a differential imbalance. The port position of port 314 or port 214 may depend on several factors. For example, the port position may be based on a radius of inner turn of second winding 210, radius of outer turn of second winding 210, radius of first winding 202, composition of first winding 202, composition of second winding 210, width of first winding 202, width of second winding 210, spacing between first turn and second turn of second winding 210, and/or outer ring 230. Positioning the single-ended port may be based on other factors.

An asymmetric balun design will position at least one terminal configured to carry an unbalanced signal or single-ended port off of a center line of the balun. The position of the single-ended port may depend on several factors, including the composition material of the balun. For example, the balun windings may include radio frequency (RF)/thick metals which may affect the imbalance of the balun. RF technologies may include an optional thick metal layer on top, such as copper and aluminum, on top of other metal layers. This composition used in the design of a balun may be a parameter to determine the best placement of the single-ended port in an asymmetric balun design. Other parameters may include dimensions such as radius, spacing, width, shape such as octagon, rectangle, square of the windings, as discussed elsewhere in this disclosure.

Antennae, or sensors, may be single-ended. However, many circuit blocks in integrated chips are differential. State-of-the-art transceivers often have on chip baluns to reduce Bill-of-Materials (BOM) and module size. Because baluns are often located at the very front-end of a transceiver, reducing a differential imbalance in the balun is critical in achieving high linearity, high efficiency, and low noise of the entire wireless communication system. It is also highly desirable to have balanced differential signal swing from a circuit reliability perspective. This provides a performance improvement and longer life expectancy for a better user experience.

Baluns may convert a differential signal to single-ended signal or a single-ended signal to a differential signal. Among many types of baluns, transformer-based baluns are commonly used in radio frequency and mm-wave transceivers. Often, baluns are integrated on silicon and may be located at the very front-end of the chip. For example, at an RF pin of the chip.

A balun transformer may have two metal windings. When alternating current (AC) signal current flows on a first winding, the magnetic field generated by the current flow couples to the second winding. To implement the magnetic, inductive, coupling on the integrated chip, two windings are typically placed on top of each other. This also brings an electric, capacitive, coupling between windings. When a balun transformer is driven differentially on both ports, the electric coupling is well balanced and does not create imbalance between positive and negative terminals of a differential port. However, when a balun transformer is driven from a differential port to a single ended port, the positive and negative terminals of the differential port may experience different capacitive coupling, and there is an imbalance in the differential signal.

Figure 4:
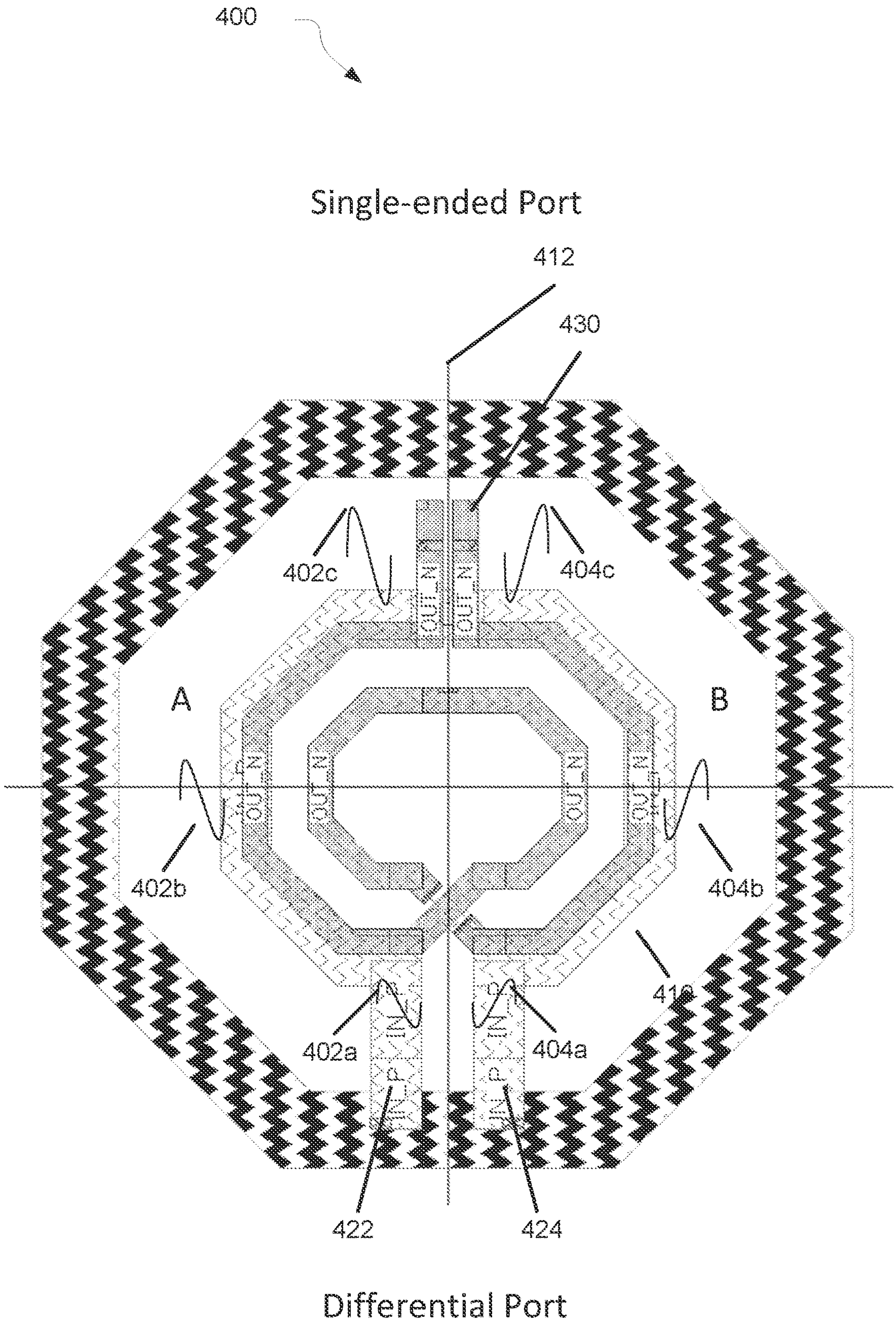
FIG. 4 illustrates an exemplary differential signal driven balun exit winding.

FIG. 4 shows a well-balanced balun 400 in which both windings are driven differentially. As shown, the sinusoidal voltages 402 and 404 on primary winding 410 would be symmetric along the vertical center line 412. For any points along the winding which are equidistant from the positive and negative terminals of the primary winding, there will be an electric coupling of the same amplitude of the out-phased voltage signal. For example, Sinusoidal voltage 402 from the positive terminal 422 to port 430 will be balanced with sinusoidal voltage 404 from the negative terminal 424 to port 430. As shown in FIG. 4., the amplitudes 402*a*, 402*b*, and 402*c* of voltage 402 match the amplitudes 404*a*, 404*b*, and 404*c* of voltage 404, respectively. Thus, balun 400 is well-balanced. This occurs because the signal on differential port 426, including terminals 422 and 424, and port 430 are both differential.

Figure 5:
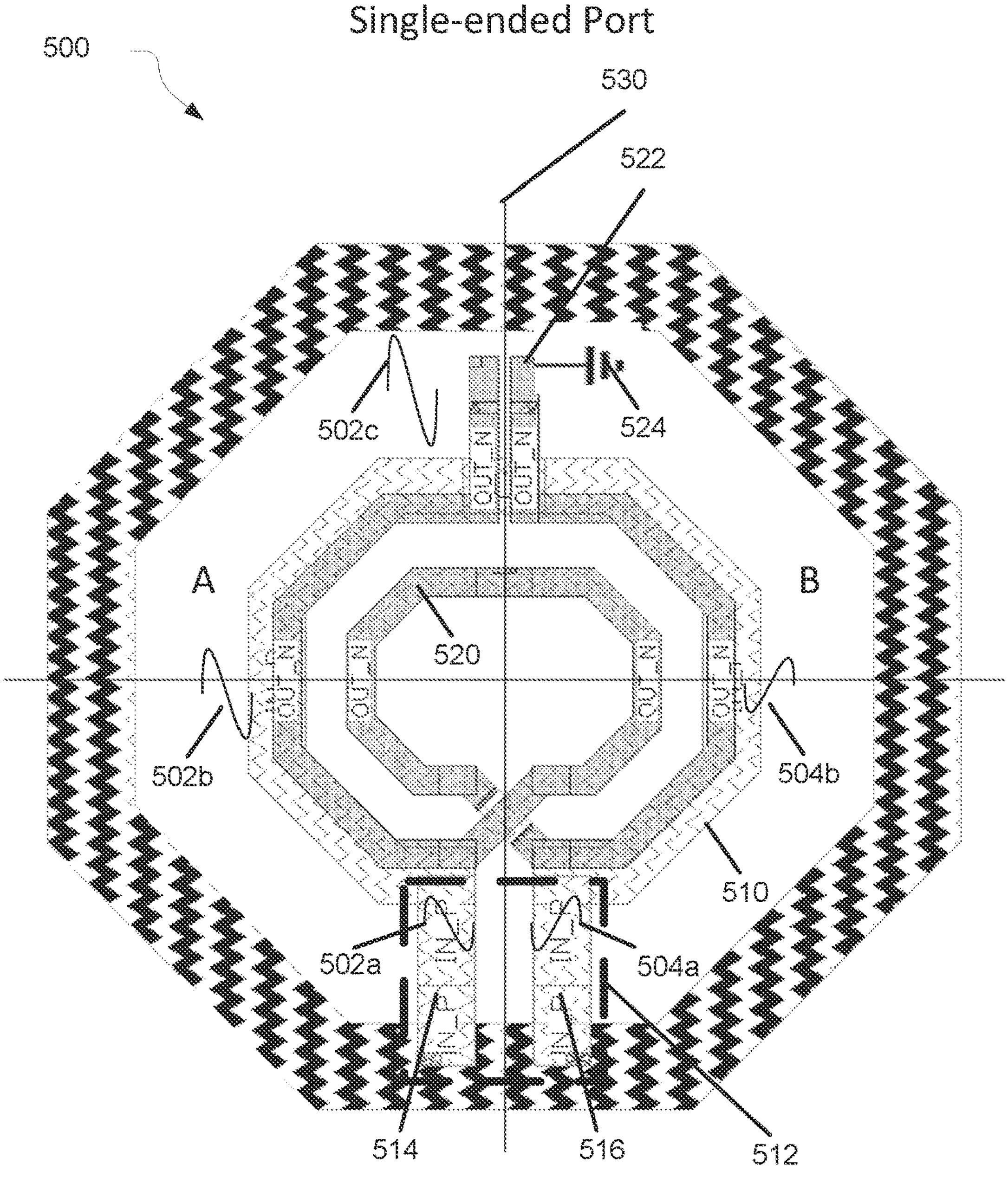
FIG. 5 illustrates an exemplary single-ended driven balun exit winding.

In contrast, FIG. 5 shows an imbalanced balun 500 in which the primary winding 510 is driven differentially and secondary winding 520 is driven by a terminal of a single-ended port. When the single-ended port 522 carries an unbalanced (e.g., single-ended) signal, the electric fields are no longer the same amplitude nor out-phase along opposite sides of center line 530. This creates an imbalance on differential port 512. Differential port 512 includes positive terminal 514 and negative terminal 516. An imbalance at differential port 512 is undesirable in several ways. Impedances seen on positive and negative rails of an amplifier are different and deviate from optimum design point ranges. This mismatch results in degraded performance metrics such as linearity, efficiency, and noise figure. As shown in FIG. 5, the sinusoidal voltage 502 from the positive terminal 514 to port 522 is imbalanced with sinusoidal voltage 504 from the negative terminal 516 to port 522. As shown in FIG. 5., the amplitudes 502*a*, 502*b*, and 502*c* of voltage 502 do not match the voltage amplitudes 504*a* and 504*b* of voltage 504, respectively. Single-ended port 522 may also be connected to ground 524, which in part generates the imbalance shown in balun 500. The amplitudes are larger on one side of the balun than on the other side of the balun along center line 530. Due to the imbalance, voltage 502 may reach the maximum allowable amplitude swing for a differential rail before voltage 504. This further reduces maximum output power of the transmitter or maximum input power of the receiver, without utilizing a full swing on both sides of the balun.

Figure 6:
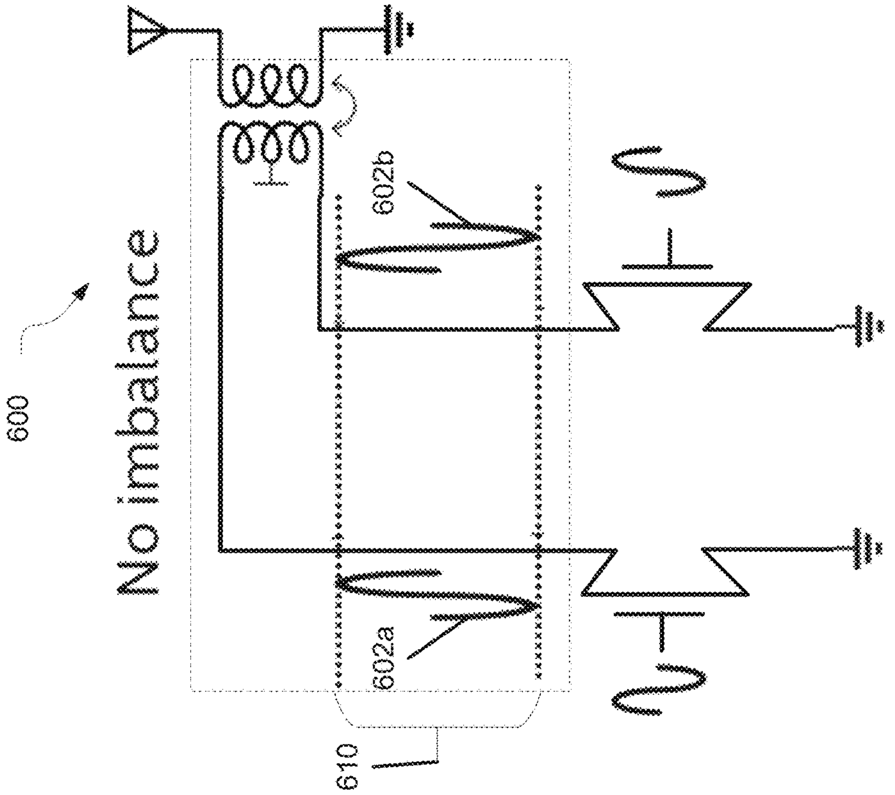
FIG. 6 illustrates balanced voltage amplitudes.

FIG. 6 shows a well-balanced voltages 602*a* and 602*b* which achieve the maximum amplitude on both sides of balun 600 at the same time. For example, a balun design as described with regard to FIG. 4. Based on the balun design of FIG. 4, the both sides of balun 600 achieve the maximum allowable amplitude 610 at the same time. This allows for maximum output power when transmitting or maximum input power when receiving, assuming balun 600 is used in a transceiver.

Figure 7:
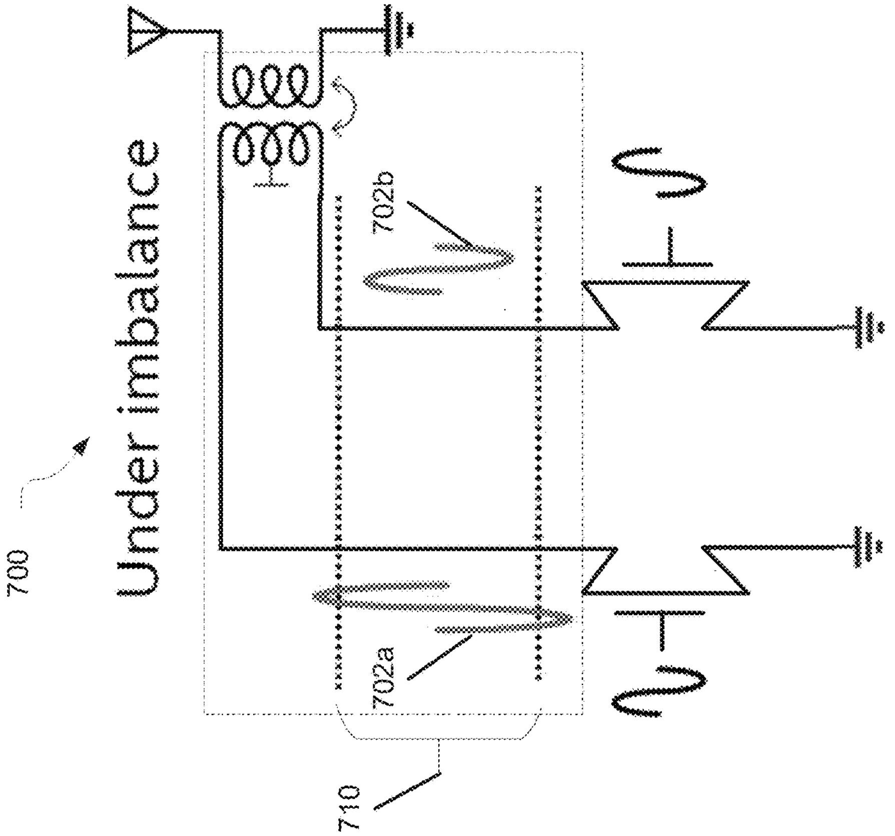
FIG. 7 illustrates imbalanced voltage amplitudes.

FIG. 7 shows an imbalanced balun 700 where the voltage 702*a* on the left side of balun 700 achieves the maximum amplitude at a different time as voltage 702*b* on the right side of balun 700. For example, a balun design as described with regard to FIG. 5. Based on the balun design of FIG. 5, one side of balun 700 achieves the maximum allowable amplitude 710 before the other side. This imbalance does not allow for maximum output power when transmitting or maximum input power when receiving, assuming balun 700 is used in a transceiver. It would be desirable to correct the imbalance as shown in FIG. 7 to achieve maximum power.

As previously described, transformers may be adopted for a differential to differential port coupling. In this case, a perfect symmetry on the center line (or line at the middle of terminals of each port) is desirable. However, when the transformer is used as a balun, a symmetric layout on the single-ended port is not required because the winding already carries single-ended (e.g., unbalanced) voltage signal. More importantly, it is not desirable because the symmetric transformer-based baluns will create unbalanced electric coupling to a differential port. To mitigate an unbalanced electric coupling, a single-ended port may introduce an imbalance an imbalance to counteract the imbalance on the differential port from electric coupling.

Positioning a port off of the center line along a single-ended winding may create a correction to the imbalance on the differential port on the transformer winding. For example, the balun designs as described in FIGS. 2 and 3. As shown in FIGS. 2 and 3, a balun design may position a single-ended port 214 or single-ended port 314 on the same winding segment or a different segment winding as single-ended port 114 of FIG. 1 to cancel an imbalance of a differential port.

Positioning a single-ended port off of a balun center-line, may correct the capacitance distributed across the entire winding. The correct capacitance achieves wideband cancellation as demonstrated in simulation results below. Additionally, the off center position does not add additional components to traditional balun design layout patterns. Therefore, no additional parasitic components are added. Finally, the circuit on the differential side of the transformer still sees perfectly balanced coil self-inductance, which is highly desirable for differential amplifiers.

Figure 8:
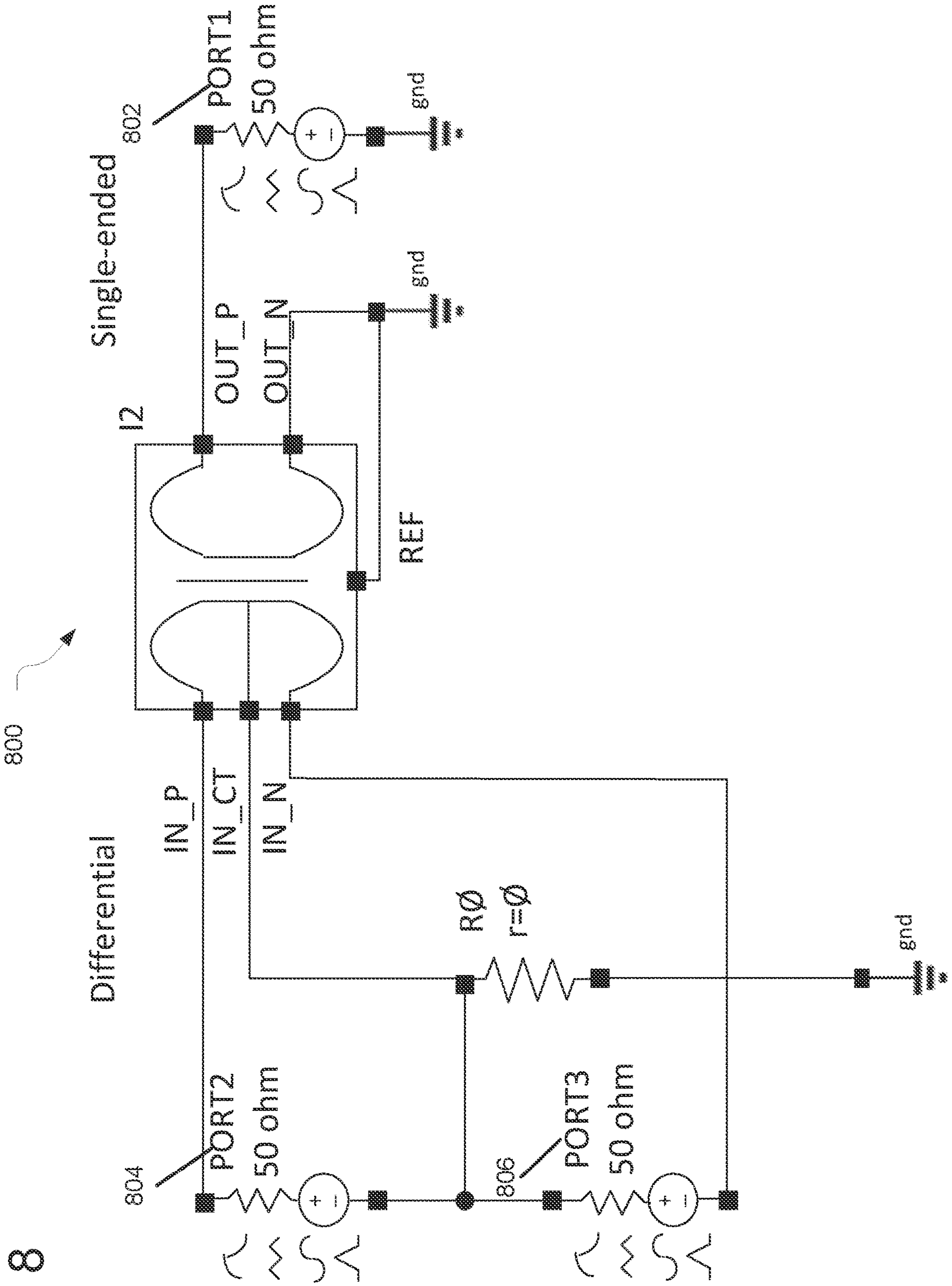
FIG. 8 illustrates a simulation of an asymmetrical port placement balun.

FIG. 8 shows a simulation for an asymmetrical balun design layout pattern 800. The transformer balun may include different port locations and are simulated in EM (electromagnetic) simulators. An s-parameter model is generated from each model and is simulated in a circuit simulation as shown in FIG. 8.

Terminal 802 is single-ended port simulation on a single-ended metal winding. Terminals 804 and 806 are placed in series combination, to simulate imbalance between terminals 804 and 806 on the differential port. An S21 parameter from port 804 to 802 and S31 parameter from port 806 to port 802 simulation are compared to evaluate imbalance on the differential side 810. Using suck a simulator, one can determine the imbalance and adjust port placement to reduce or eliminate the differential imbalance. For example, the balun design simulator may allow for testing different designs before producing a balun. One can input parameters of a symmetrical design to measure a differential imbalance on the balun design. The parameters may be changed to reduce the measured imbalance. For example, the position of port 802 may be moved along the transformer winding to determine its effect on the differential imbalance. Alternatively, an angle of port 802 relative to ports 804 and/or 806 may be modified to determine the angle's effect on the differential imbalance.

Using an algorithm to minimize the differential imbalance in conjunction with the simulator may optimize determining the optimal placement of port 802. Such an algorithm may evaluate incremental changes of port 802's position along a segment of the transformer winding. Alternatively, the algorithm may evaluate changes in the angle between a differential port, terminals 804 and 806, and a single-ended port 802. More than one optimal port position may minimize the differential imbalance. The algorithm may be configured to return the first port position to minimize the differential imbalance or return after determining all port positions which minimize the differential imbalance. The algorithm may consider other factors to determine an optimal port position. For example, a port position on the same winding segment as a symmetrical balun design may be considered more desirable as a port position which is on a different winding segment as a symmetrical balun design. Additionally, the algorithm may be configured to with an incremental change to reduce execution time. For example, the algorithm may only evaluate 0.5 μm incremental changes in position and/or integer angle measurements.

Figure 9:
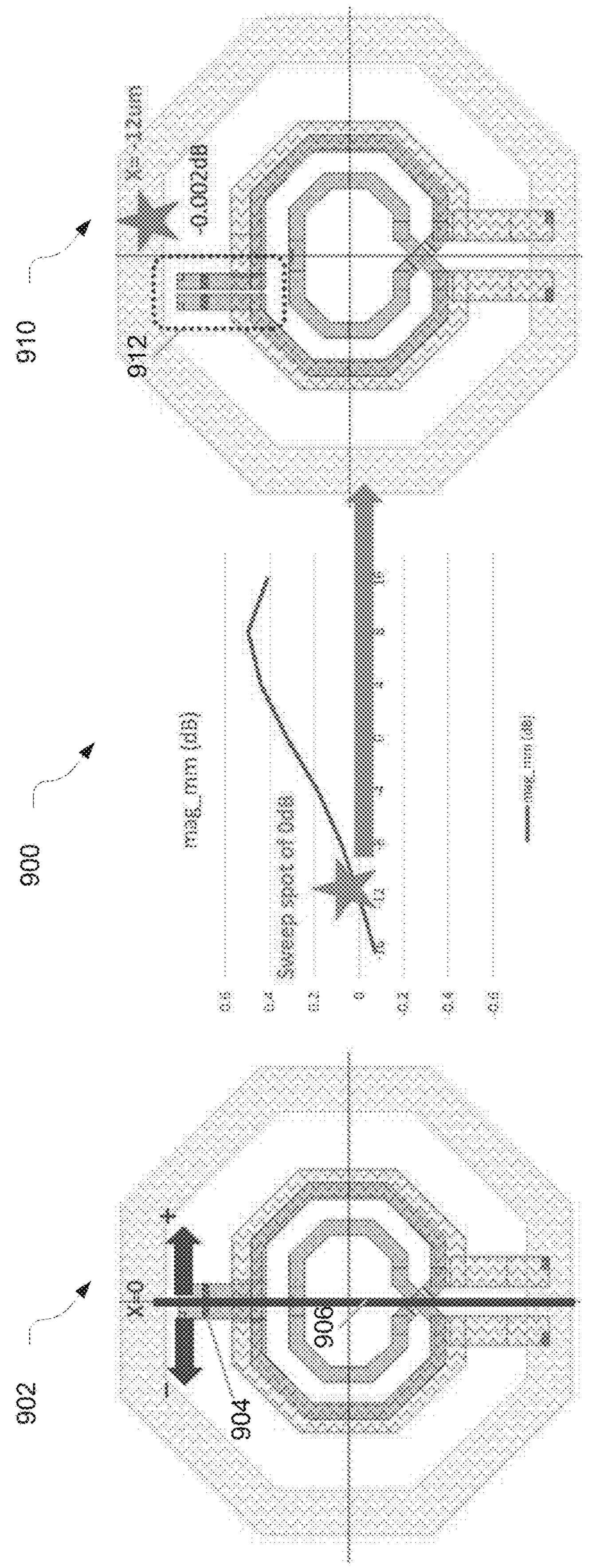
FIG. 9 illustrates a method of determination of asymmetrical port placement.

FIG. 9 shows a plot 900 of imbalance values based on single-ended port position. Symmetrical balun design 902 may position single-ended port 904 along vertical center line 906. Design 902 may be entered into a simulation program, such as described with regard to FIG. 8, to determine a differential imbalance. For example, entering in the parameters as described in FIG. 1 may result in a differential imbalance of approximately 0.3 dB. Symmetrical balun design 902 may include several parameters which may be entered into a simulation program to measure the differential imbalance of the design. For example, a first winding with a differential port composed of a metal layer, such as copper, for signal processing technology with a one turn coil having a radius to inner metal edge of 34.5 μm and a metal width of 9.9 μm. It may also include a second winding with a single-ended port composed of a metal layer, such as aluminium, with a two turn coils having a radius to inner metal edge of 22.5 μm, a metal width of 5 μm, and a spacing between turns of 7.9 μm. Additionally, design 902 may include an outer-ring, often called "guard-ring", made of a metal layer connected to a ground reference signal. The metal layers may be composed of any suitable metal for use in RF technologies.

Plot 900 plots the magnitude (mag_mm) imbalance in dB as a function of single-ended port position, where position 0 is the position along vertical center line 906 as shown in balun design 902. Plot 900 shows the incremental changes as determined by an algorithm. From the reference balun design 900, a negative port position indicates a movement to the left and a positive port position indicates a movement to the right. The imbalance is measured for the port position at different points along the x-axis. For example, positioning the single-ended port at −12 μm results in a 0 or near 0 simulated differential imbalance measured in dB. Balun design 910 shows the port position 912 which may reduce a differential imbalance to 0 or near 0 dB. Please note that the desirable location will differ from design to design and there may be more than one position to achieve the goal of 0 or near 0 imbalance. An imbalance of a symmetrical port position design also differs from design to design, where the design parameters may include a winding radius, a winding composition, a winding spacing, and/or inclusion of a guard ring.

Figure 10:
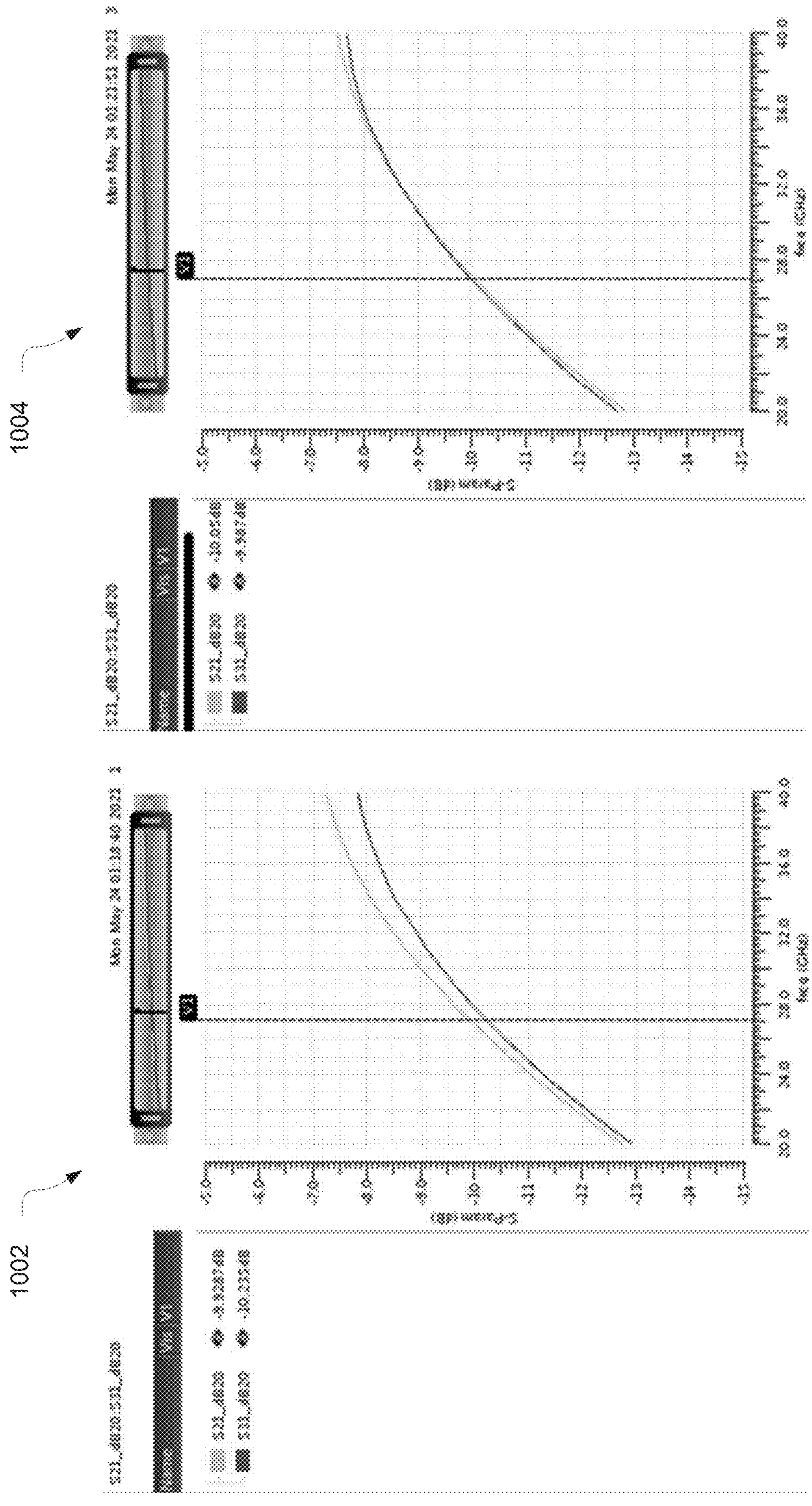
FIG. 10 illustrates the frequency response to asymmetrical port placement.

FIG. 10 shows a frequency response of a balun. Chart 1002 shows a frequency response for a symmetrical balun design, such as balun design 902. Chart 1004 shows a frequency response for an asymmetrical balun design, such as balun design 910. Charts 1002 and 1004 compare the S21 and S31 parameters as previously described. The parameters are plotted as a function of frequency. As seen in Chart 1002, the imbalance between the two parameters grows with an increase in frequency. As seen in Chart 1004, the imbalance remains 0 or near 0 between the two parameters as the frequency increases. One can see the imbalance correction is very wideband. This is a critical advantage over correction by a lumped component capacitors, which rely on narrowband resonance.

Figure 11:
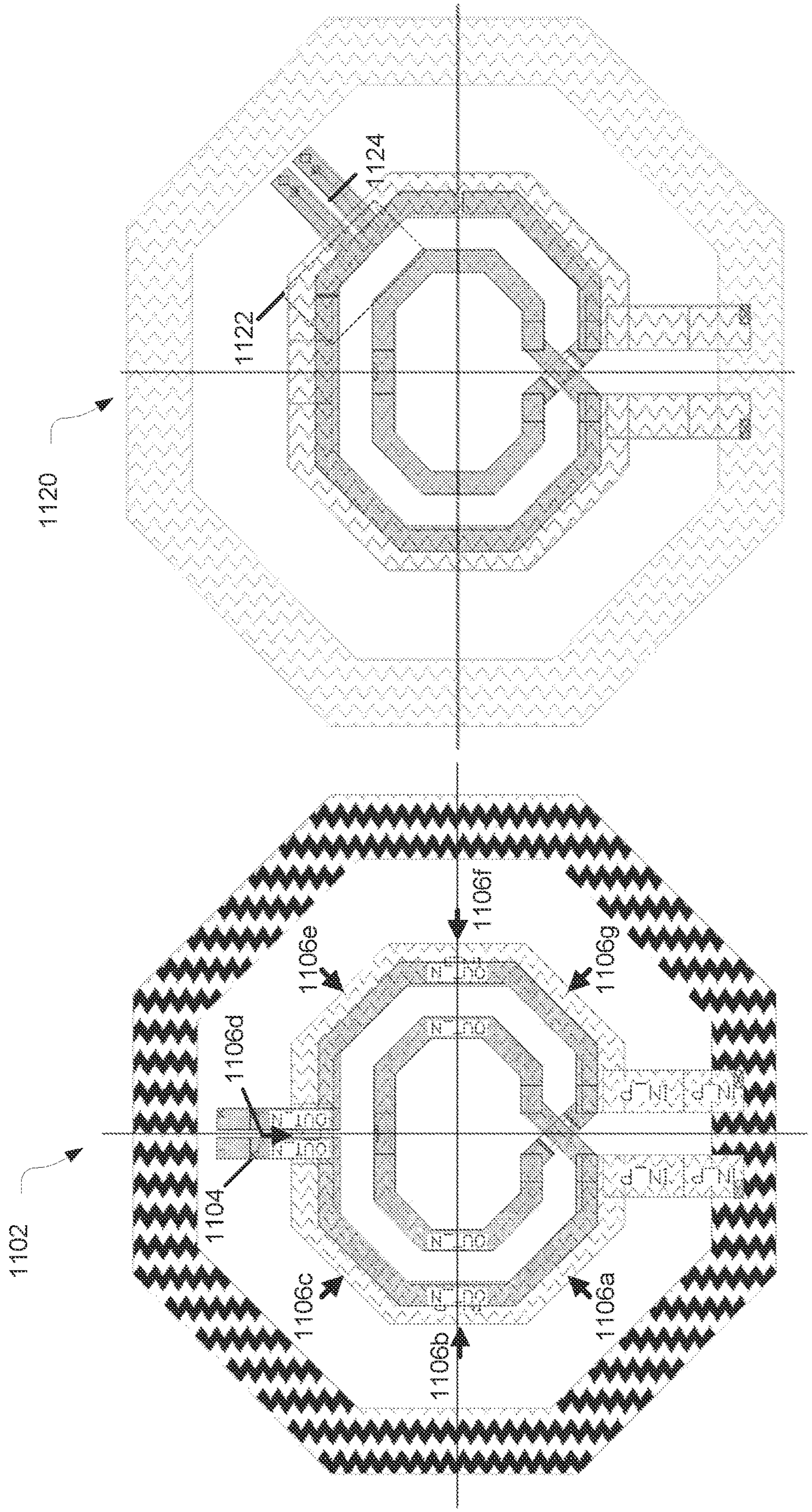
FIG. 11 illustrates the resultant imbalance based on port placement.

FIG. 11 shows balun design 1102. Balun design 1102 may be similar to balun design 902 as previously described. Balun design 1102 may include single-ended port 1104 positioned along a vertical center line. Imbalances **1106*a-g* (−5.58, −3.28, −1.24, 0.32, 0.003, 0.85, −1.86 dB, respectively) show shows the change in differential imbalance based on different single-ended port positions. Port position 1106*e*, at 225 degrees, generates the lowest magnitude differential imbalance (0.003 dB). FIG. 11 shows the port positions at different angles as compared to horizontal change as described in FIG. 9. The port 1124 positioned at other segments of second winding 1122, as shown in balun design 1120, achieve cancellation or near cancellation as well as the balun design 910. The underlying principle is the same as that described with respect to FIG. 9. Creating an imbalance on single-ended port 1124 to cancel the unwanted imbalance from capacitive coupling. For example, port 1124, on the single-ended winding simulated at the center of each single-ended winding segment to compare the imbalances as shown by imbalance magnitude values 1106*a-g*, measured in dB. For example, the imbalance values 1106*a-g*** may represent a single-ended port position at angles 45, 90, 135, 180, 225, 270, and 315 degrees, respectively. It should be noted that other angle positions may be possible for eliminating a differential imbalance.

Figure 12:
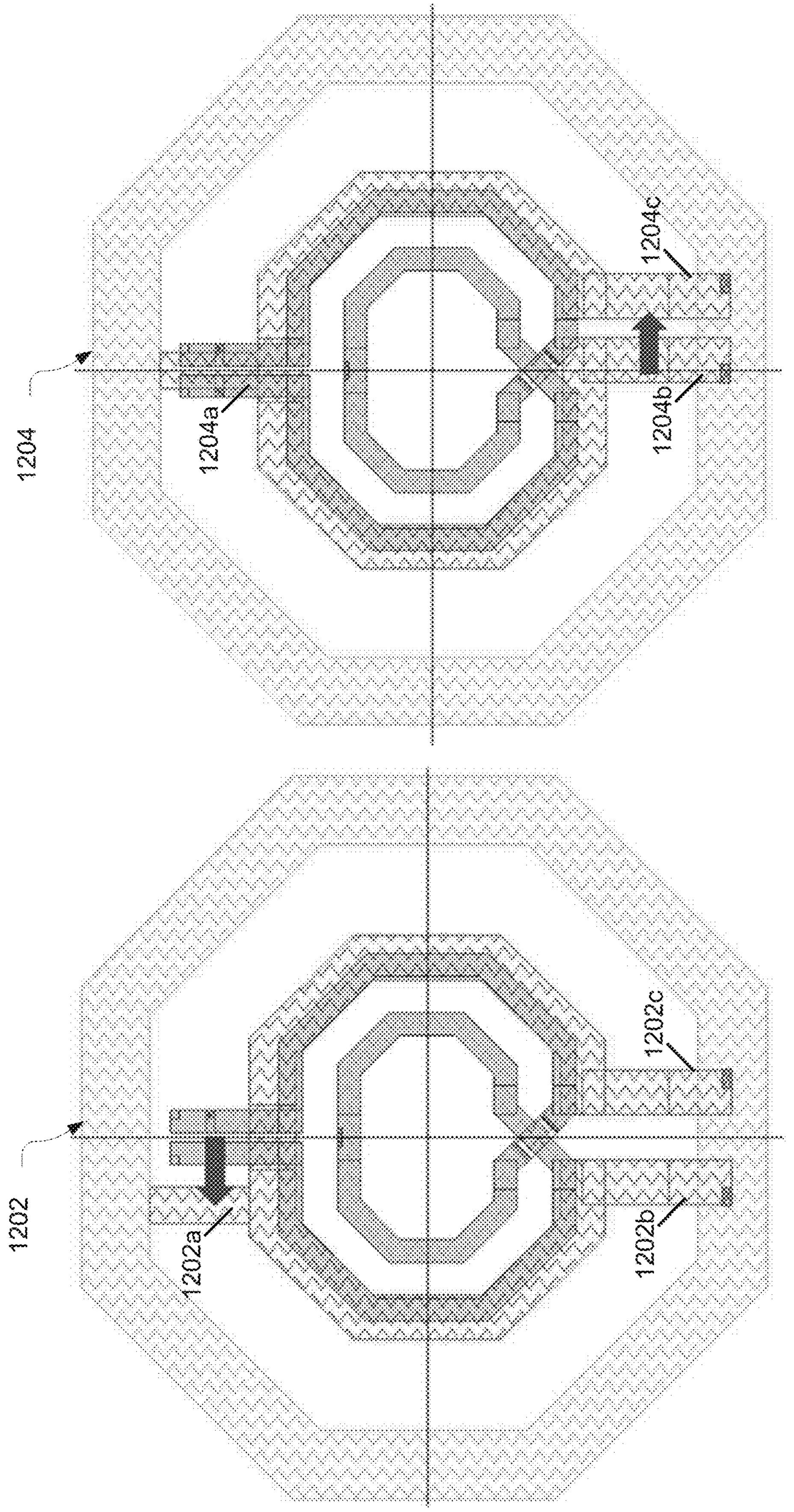
FIG. 12 illustrates a comparison between an asymmetric port placement on the single-ended winding vs an asymmetric port placement on the differential winding.

FIG. 12 shows a comparison between positioning the single-ended port off center 1202 and positioning the differential port off center 1204. The previous descriptions have been made with reference to positioning the single-ended port off center. It may be desirable to keep the differential port symmetric between its port terminals because each rail of a differential circuit sees the same self-inductance and same parasitic resistance. However, when it comes to correcting balun imbalance only, displacing a differential port can achieve similar effect. For example, off center design 1204 achieves the same distance between the differential terminals and the single-ended port as off center design 1202. For example, the distance between **1202*a* and 1202*b* may be the same as the distance between 1204*a* and 1204*b*. Similarly, the distance between 1202*a* and 1202*c* may be the same as the distance between 1204*a* and 1204*c***.

Transformer baluns have had an increased use in fifth-generation (5G) applications. Transformer baluns may be integrated in radio transceivers. A transformer balun may be designed for millimeter-wave frequencies and implemented on a complementary metal oxide semiconductor (CMOS) with an integrated mixer. For example, an integrated balun may be configured for up to a measured amplitude of 5 dB and phase balance of 7 degrees over 50-70 GHz frequency band. This may achieve a relatively small footprint, simple layout, and wide operational frequency range.

Figure 13:
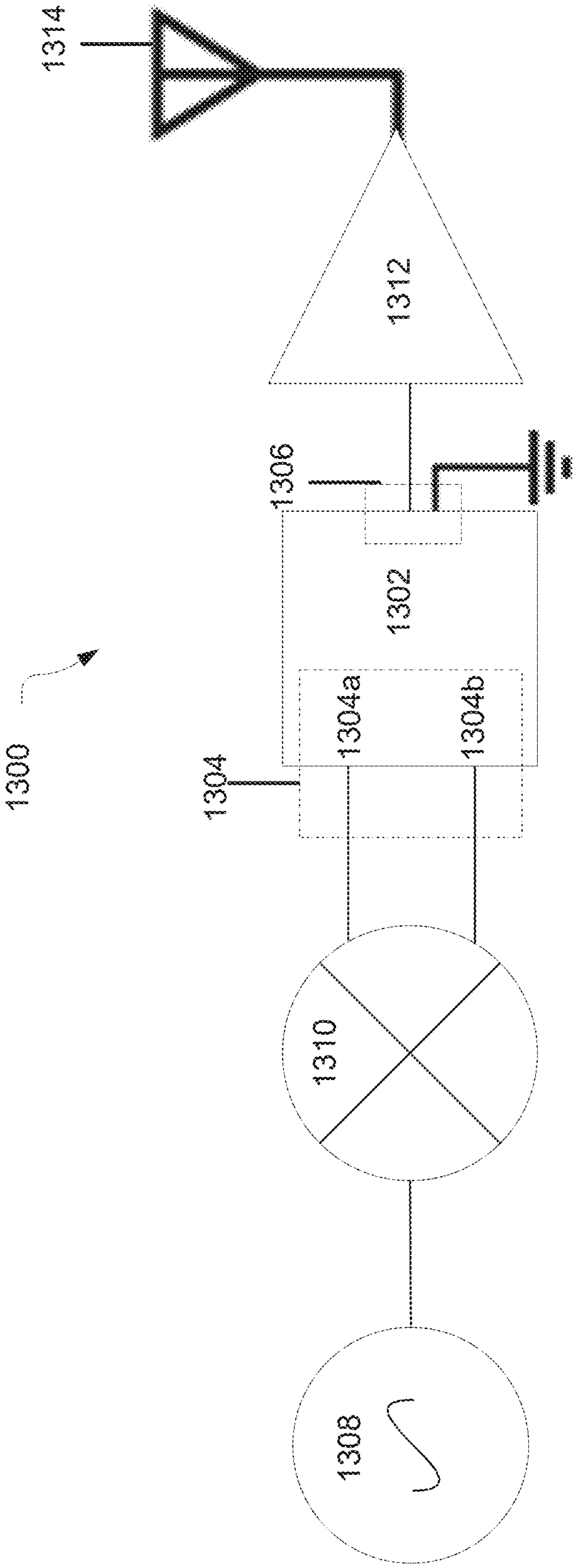
FIG. 13 illustrates a block diagram of transceiver with an integrated balun.

FIG. 13 shows a block diagram of transceiver 1300 with integrated balun 1302. Balun 1302 may include differential port 1304 configured to receive a balanced signal and single ended port 1306 configured to output an unbalanced signal. Differential port 1304 may include positive terminal **1304*a* and negative terminal 1304*b*. Transceiver 1300 may include local oscillator (LO) 1308 configured to generate a signal at a defined frequency range. LO 1308 may output the signal to mixer 1310. Mixer 1310 may generate a balanced signal based on the signal from LO 1308. Mixer 1310 may output the balanced signal to port 1304 of balun 1302. Balun 1302 may generate an unbalanced signal based on the balanced signal from mixer 1310. Balun may output the unbalanced signal to power amplifier 1312. Power amplifier 1312 may be coupled to antenna 1314. Antenna 1314** may be configured to transmit the unbalanced signal.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

What is claimed is:

1. A circuitry comprising:

a first winding extending between a first terminal and a second terminal, the first winding defining a single loop; and a second winding extending between a third terminal and a ground terminal, and comprising a self-crossing region in which a first portion of the second winding crosses over a second portion of the second winding to define an outer loop of the second winding and an inner loop of the second winding, wherein the inner loop is within the outer loop;

wherein the first winding is coupled to the second winding;

the first terminal, coupled to a first end of the first winding;

the second terminal coupled to a second end of the first winding, wherein there is an imbalance between the first terminal and the second terminal when a current flows through the first winding; and the third terminal coupled to the second winding, wherein a terminal position of the third terminal along the second winding mitigates the imbalance on the first winding;

and wherein the second winding is substantially within the first winding.

2. The circuitry of claim 1, further comprising a differential port, wherein the differential port includes the first terminal and the second terminal.

3. The circuitry of claim 2, further comprising a single-ended port, wherein the single-ended port includes the third terminal and the ground terminal coupled to the second winding, wherein the ground terminal is connected to a reference signal.

4. The circuitry of claim 3, wherein the terminal position of the third terminal is off a center of the circuitry.

5. The circuitry of claim 1, further comprising an outer ring encircling the first winding and the second winding.

6. The circuitry of claim 5, wherein the outer ring is coupled to a ground reference signal.

7. The circuitry of claim 1, wherein the first winding includes one or more turns.

8. The circuitry of claim 1, wherein the second winding includes a first turn and a second turn, wherein the first turn encircles the second turn.

9. The circuitry of claim 1, wherein the first winding overlaps an outer loop of the second winding.

10. The circuitry of claim 1, wherein the second winding crosses the first winding a maximum of two times.

11. A circuitry comprising:

a first winding extending between a first terminal and a second terminal, the first winding defining a single loop; and a second winding extending between a third terminal and a ground terminal, and comprising a self-crossing region in which a first portion of the second winding crosses over a second portion of the second winding to define an outer loop of the second winding and an inner loop of the second winding, wherein the inner loop is within the outer loop;

wherein the first winding is coupled to the second winding;

a single-ended port coupled to the second winding, wherein the single-ended port includes the third terminal and the ground terminal;

the first terminal coupled to a first end of the first winding; and the second terminal coupled to a second end of the first winding, wherein there is an imbalance between the first terminal and the second terminal when a current flows through the first winding, and wherein a first position of the first terminal and a second position of the second terminal along the first winding mitigates the imbalance on the first winding; and wherein the second winding is substantially within the first winding.

12. The circuitry of claim 11, further comprising a differential port, wherein the differential port includes the first terminal and the second terminal.

13. The circuitry of claim 12, wherein a position of the differential port is off a center line of the circuitry.

14. The circuitry of claim 11, wherein the first winding overlaps an outer loop of the second winding.

15. The circuitry of claim 11, wherein the second winding crosses the first winding a maximum of two times.

* * * * *